Jan. 24, 1961 F. G. VON SAURMA 2,969,211
INFLATABLE-WING ROCOPTER
Filed Oct. 6, 1959 5 Sheets-Sheet 1
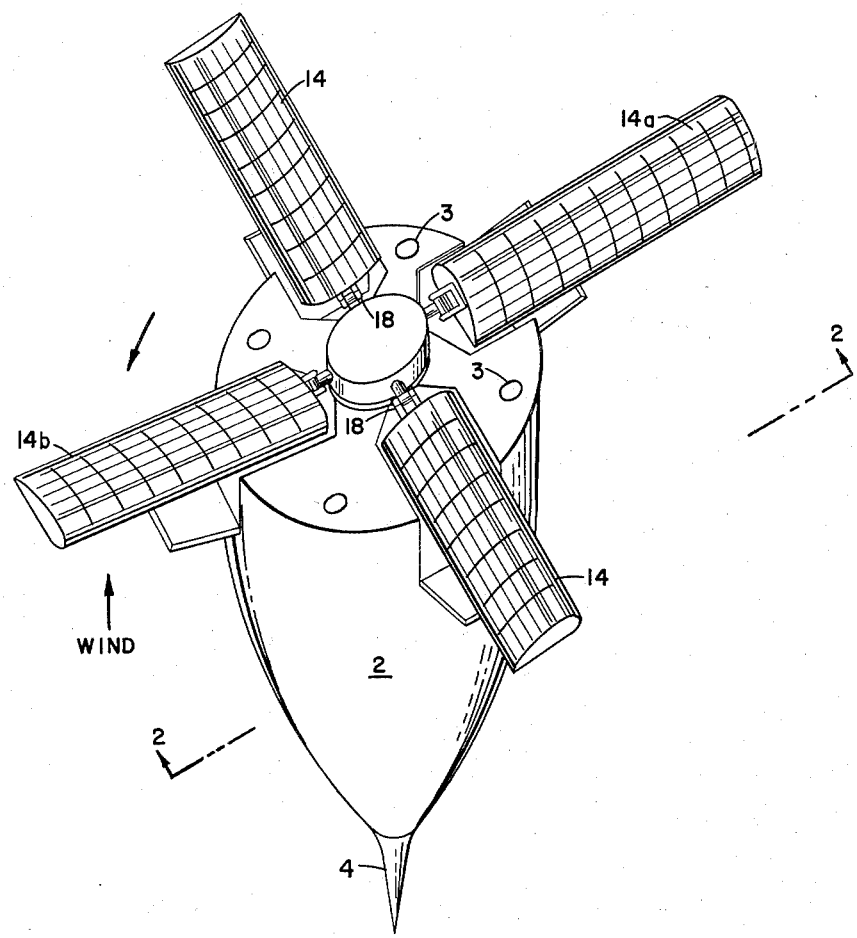
FIG. I
Friedrich G. von Saurma,
INVENTOR.
BY S. J. Rotondi,
A. T. Dupont, and
Alvin E. Moore,
ATTORNEYS.

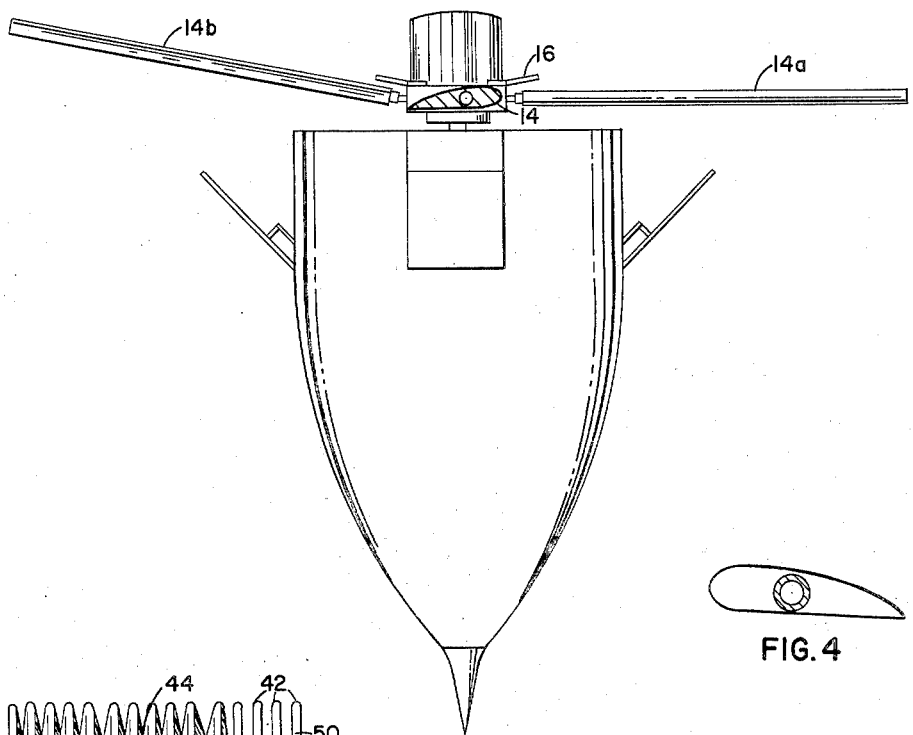
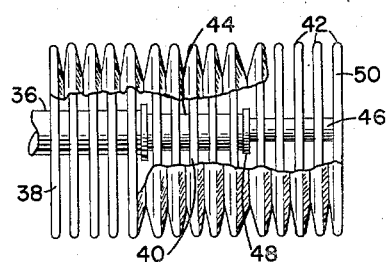
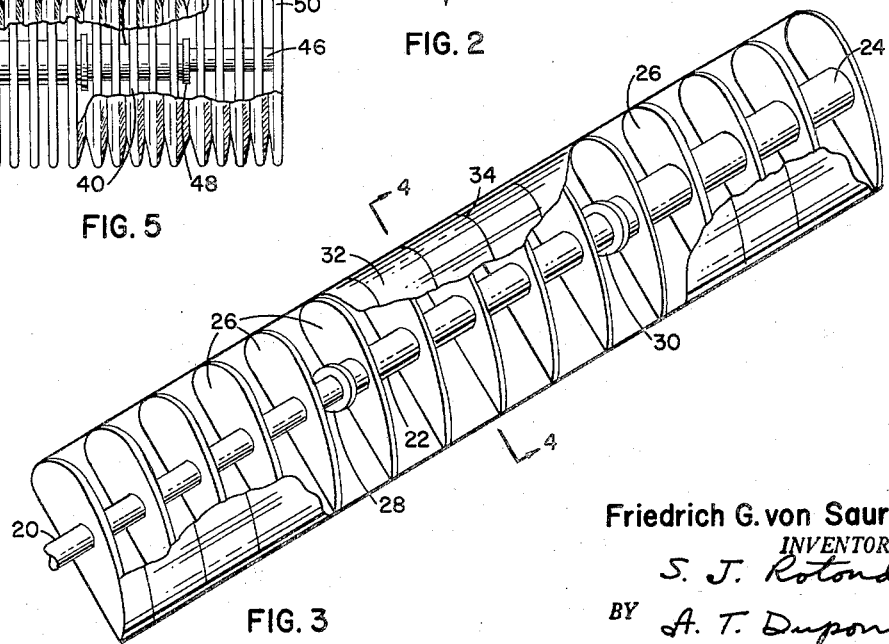

Friedrich G. von Saurma,
INVENTOR.

BY S. J. Rotondi,
A. T. Dupont, and
Alvin E. Moore,
ATTORNEYS.

Jan. 24, 1961 F. G. VON SAURMA 2,969,211
INFLATABLE-WING ROCOPTER
Filed Oct. 6, 1959 5 Sheets-Sheet 4

Friedrich G. von Saurma,
INVENTOR.

BY S. J. Rotondi,
A. T. Dupont, and
Alvin E. Moore,
ATTORNEYS.

United States Patent Office 2,969,211
Patented Jan. 24, 1961

2,969,211

INFLATABLE-WING ROCOPTER

Friedrich G. von Saurma, 3309 Panorama Drive SE., Huntsville, Ala.

Filed Oct. 6, 1959, Ser. No. 844,834

6 Claims. (Cl. 244—138)

(Granted under Title 35, U.S. Code (1952), sec. 266)

The invention described herein may be manufactured and used by or for the Government for governmental purposes without the payment of any royalty thereon.

This invention relates to an inflatable-wing rocopter. The word rocopter is defined as a space vehicle or vehicle capsule that is propelled by rocket power into space or the upper levels of the stratosphere and is decelerated by means of wind-rotated wings as it enters and traverses the denser part of the atmosphere. The rocopter of the invention comprises accordion wings or airfoils that are supported in a collapsed state at one end of a rocket-driven space vehicle, or of a cargo cabin that has been separated during its flight from a rocket-driven booster. Such a rocopter provides light-weight, easily stored vanes which may be extended into wings that are sufficiently long to brake the descent of the vehicle.

It is, accordingly, an object of this invention to provide a rocopter comprising collapsible and inflatable wind-rotated braking vanes, for decelerating the craft on its descent thru the atmosphere.

Another object of the invention is to provide a rocopter comprising a wind-rotated rotor, a servo motor supported by the rocopter frame and gearing between said rotor and frame that serve as a direction-controlling means, which counteracts the tendency of friction on the rotor bearings to rotate the craft.

A further object is to provide a rocopter comprising inflatable wings that are housed in their collapsed state within a cabin or vehicle, and are expanded thru slots in the wall of the vehicle, said slots having covers that serve as air brakes.

The foregoing and other objects of the invention will become more fully apparent from the following detailed description of exemplary structure embodying the invention, and from the accompanying drawings, in which:

Figure 1 is a perspective view of the rocopter of the invention, with inflated wings that are shown as being rotated by the wind of descent.

Figure 2 is an elevational view, partly in section, of the rocopter of Figure 1.

Figure 3 is a detail, perspective view, partly in section, of one form of rocopter wing, shown in its extended position.

Figure 4 is a sectional view from the plane 4—4 of Figure 3.

Figure 5 is a detail, plan view, partly in section, of a second form of rocopter wing, shown in its collapsed position.

Figures 1 to 10 illustrate a form of the invention which comprises inflatable rocopter blades that are housed during the rocket-propelled part of the vehicle's flight inside the shell of the vehicle, and that are expanded into operable position thru slots in the shell.

The numeral 2 designates a rocopter, shown in Figures 1 and 2 as having re-entered the troposphere, where its inflated wings are being rotated by the relative wind of the craft's descent. This vehicle, as shown in Figure 1, is a complete rocket-propelled missile, having rocket-motor nozzles 3. But the vehicle obviously may be the atmosphere-reentering nose portion of a composite missile, which on its upward flight has been separated, in known manner for example by the explosion of frangible bolts, broken from a booster of a known type such as is shown, for example, in Figure 11.

Elements 3 are fixed to housing 2, as by welding, nuts or the like; and the housing incloses guidance and control instruments and a payload, which may be cargo or passengers.

Element 4 is a landing spike designed for piercing easily penetrated material of a landing area and for holding the cabin in an upright position after landing. Any type of conventional landing gear may be utilized in lieu of spike 4.

Figure 9:
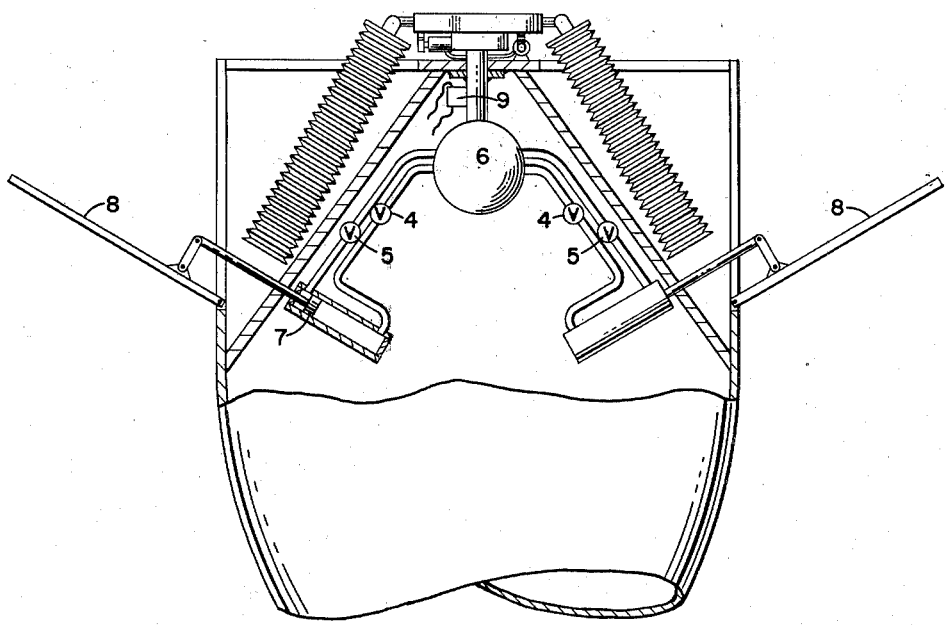
Figure 9 is an elevational view, partly broken away, of the upper or after part of the rocopter, showing the covers of the blade slots as having been opened, in which position they brake the descent of the vehicle in the atmosphere.

Figure 9 shows the after portion of the rocopter in the stratosphere. Its booster has been separated, and in response to a control signal from its guidance and control system, which may be overcontrolled by radio from the ground, or by an operator aboard the cabin, valves 4 and 5 have been solenoid-operated to allow the passage of compressed air (or other pressurized fluid) from reservoir 6. Pistons 7 thus have been forced into their outer position, opening, and holding open, covers 8. These covers act as brakes, aiding in decelerating the rocopter in its swift descent.

Figure 6:
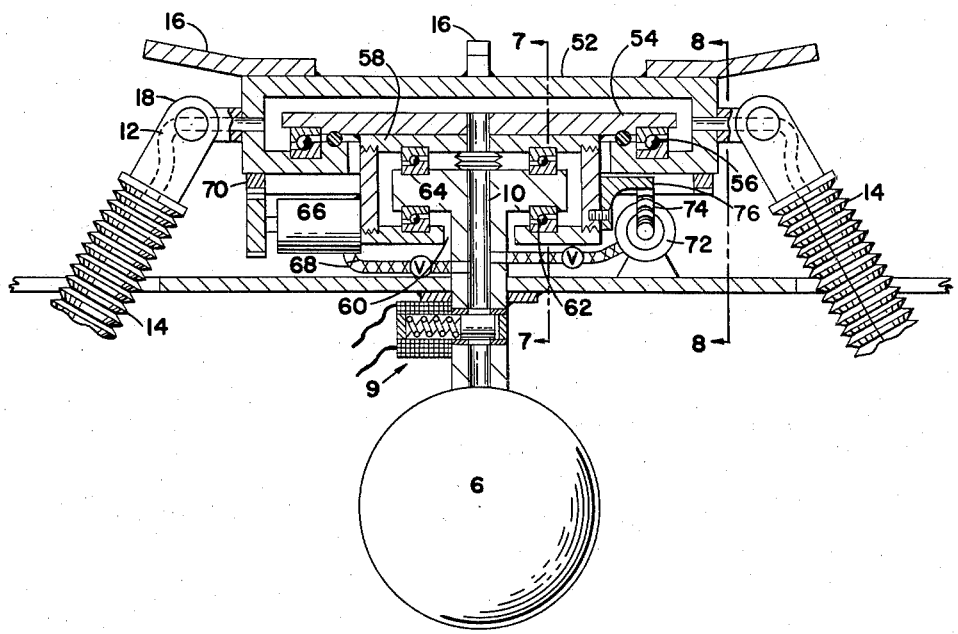
Figure 6 is a sectional view of the rotor hub assembly.

After the cabin is thus decelerated to a predetermined extent, valve 9, shown in Figure 6 as solenoid-operated, is opened, preferably by a signal from the guidance and control system, and air passes from reservoir 6 thru flexible conduits 10 and 12 to vanes 14. These vanes thus are inflated and extended; and the rarefied air of the upper atmosphere forces them into the approximate position of Figure 1. Stops 16 may be provided, as shown in Figure 6, to prevent the vanes from being initially opened to a position parallel to the axis of the rotor.

As the descent progresses, and the atmosphere becomes sufficiently dense, the relative wind begins to rotate the vanes, and their airfoil configuration causes them to exert a lifting force on the cabin or capsule. The centrifugal force that is produced by this rotation tends to hold the vanes in the nearly horizontal position indicated by 14a in Figures 1 and 2; and the lifting force on the vane tends to move it, on its pivot bearings 18, into the raised position indicated by 14b. As shown in Figure 1, wing 14b is being rotated counterclockwise against the direction of the relative wind, so that this wing, as indicated in Figure 2, has risen, against the action of centrifugal force, thus reducing its lifting force until its lift balances the centrifugal force. On the other hand, the opposite wing, 14a, is moving with the relative wind, and has risen very little.

In Figures 3 and 4 one form of lifting vane construction is shown. This vane comprises three telescopic tubes 20, 22 and 24, with the tube of smallest diameter, 20, being nearest to the hub or center of rotation. On these tubes plastic or aluminum alloy ribs 26 are slidably mounted, and are moved inward by collars 28 and 30 when the vane is collapsed. Cover 32 is of heat-resistant synthetic rubber or plastic, has accordion-like fold lines 34, and is glued or otherwise fixed to the ribs.

In the form of lifting vane shown in Figure 5, the telescopic tube of largest diameter, 36, is nearest to the center of rotation. Ribs 38 are fixed to tube 36; whereas ribs 40 and 42, are slidably mounted on tubes 44 and 46, and are moved inward by collar 48 and end rib 50 when the vane is collapsed. End rib 50 is fixed to outer tube 46.

One of various bearing assemblies suitable for an inflatable rocopter rotor is shown in Figure 6. In this assembly the lifting vanes are pivotally mounted relative to hub 52 by means of clevis-like pivot bearings 18, and hub 52 rotates relative to disk 54 by means of bearings 56.

Disk 54 is welded or otherwise fastened to parti-cylindrical element 58, which has an arcuate slot 60 thru its lower wall. This slot allows cylindrical element 58, hub 52 and vanes 14 to pivot on bearings 62 around the axis of trunnions 64.

During rotation of the rotor by the wind of descent the friction on bearings 56 tends to cause a slow rotation of disk 54, and of the cabin, in the direction of the rotor's rotation. To counteract this tendency, and to stop the rotation of disk 54 in any desired azimuth angle, motor 66 is provided. Motor 66 may be electrical, but as shown is a compressed air turbine, receiving pressurized air from air line 68. This motor is controlled by a solenoid-operated valve that is actuated either by an operator aboard the cabin or in response to a signal from the guidance and control system and/or a ground radio command station. To stop the rotation of the cabin, motor 66 is driven, turning ring gear 70 and placing a torque on the rotor, tending to turn the rotor faster than the wind is turning it. Thus an opposite-turning reaction is placed on the cabin, which stops its friction-induced rotation at the desired azimuth angle of trunnions 64.

After the cabin is thus oriented in azimuth, by actuation of motor 66 until the axis of trunnions 64 is normal to the line of gliding toward the desired landing place, compressed-air motor 72 is similarly actuated, turning worm segment 74 and pivoting bracket 76, to which segment 74 is welded. Bracket 76 preferably is arcuate on the upper surface, curved about the axis of cylindrical element 58, to provide uniform clearance between the bracket and hub 52 in all the pivotal positions of the bracket. The bracket is fixed to element 58, by bolts or welding, so that element 58, disk 54 and hub 52 may be pivoted together about the axis of element 58. In this manner, the rotor is tilted until the glide path of the rocopter intersects the desired landing area.

Figure 11:
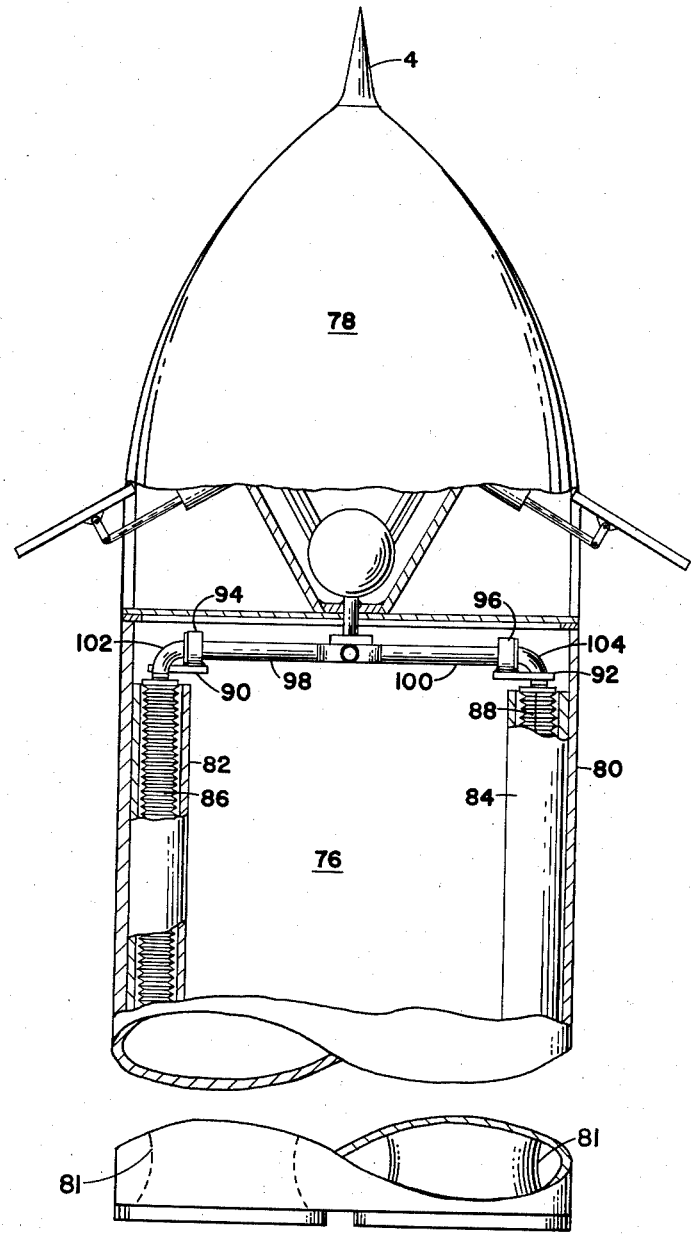
Figure 11 is an elevational view, partly in section, of a second form of the rocopter.

Figure 11 illustrates a second form of the invention, which comprises inflatable rocopter blades that are housed within the booster portion of a composite space vehicle during the first part of the vehicle's flight, and are separated from this portion when the booster falls away from the nose portion 78 of the vehicle.

The booster comprises a shell 80 and any known type of rocket motor or cluster of rocket motors. In Figure 11 there is semi-schematically shown a cluster of motors, having nozzles 81.

The booster also may comprise two vane housings 82 and 84. Whether or not such protective housings are utilized in a particular composite missile depends on the types of rocket motor fuel and fuel-supply system that are located within the booster shell.

Vanes 86 and 88, which are constructed as indicated in Figures 3 to 5, are held in a canted position, out of parallelism with the longitudinal axis of the missile, by means of stops 90 and 92. These stops are welded or otherwise fixed to portions 94 and 96 of the rotary hub. Portions 94 and 96 are welded to hub spokes 98 and 100, which may be of streamlined or lifting airfoil-shaped, and house bearings by means of which the vanes, with their curved roots 102 and 104, may pivot relative to hub portions 94 and 96.

Housings 82 and 84 are sufficiently long in the direction of a plane normal to the paper in Figure 11 to allow enough clearance between the housings and the leading and trailing edges of the airfoil portions of the vanes to prevent jamming of the vanes against the housing walls when the booster, with the housings, is forced away from the forward cabin and the vanes. In Figure 11, vane 86 is shown as held by stop 90 so that its outer tip is canted toward the observed, whereas vane 88 is held by stop 92 so that its outer tip is canted away from the observer.

After separation of the booster and cabin, and the cabin has entered the lower levels of the stratosphere, the canted position of the vanes enables the force of the relative wind to begin turning the rotor. Thereafter, centrifugal force causes the vanes to tilt away from stops 94 and 96, until the centrifugal and aerodynamic forces on each of the vanes is balanced. Although only two lifting vanes or wings are shown in Figure 11, it is obvious that any practical number of such vanes, as determined by engineering calculations, may be utilized.

Figure 7:
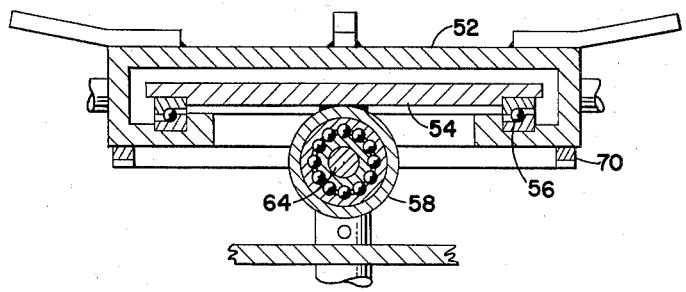
Figure 7 is a sectional view from the plane 7—7 of Figure 6.
Figure 8:
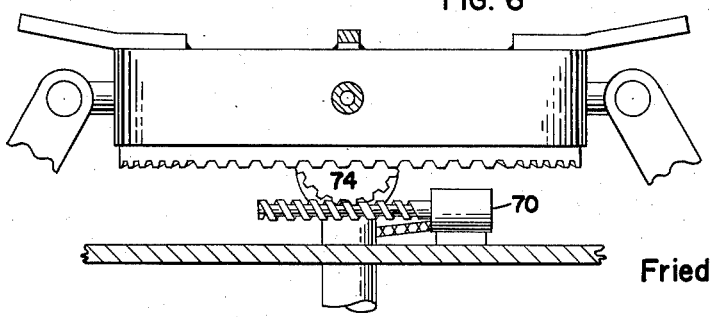
Figure 8 is a sectional view from the plane 8—8 of Figure 6.
Figure 10:
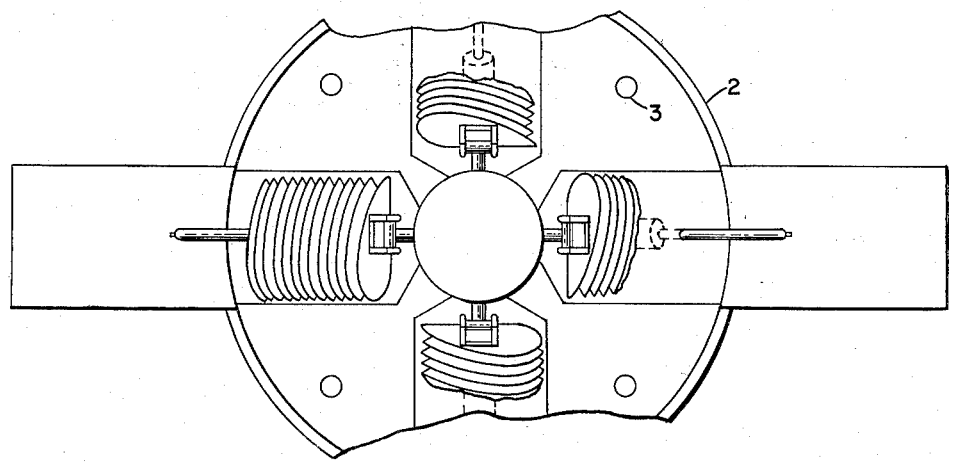
Figure 10 is a plan view, partly broken away, of the rocopter of Figure 9.

In this form of the invention control motors and gearing of the type shown in Figures 6 to 8 may be utilized to control the direction of the glide path. As an obvious structural alternative, any known type of cyclic pitch-changing hub assembly, such as its commonly used in helicopters, may be utilized to control the pitch of the wind-rotated, inflated vanes.

The invention also comprehends various other obvious changes in structure from that herein illustrated, within the scope of the subjoined claims.

The following invention is claimed:

1. A space vehicle comprising: a rocket-propelled housing having a rotor-supporting wall; a rocket motor; means connecting said rocket motor to said housing, whereby said housing may be propelled up thru the atmosphere to the stratosphere; a support attached to said wall; bearings carried by said support; a hub journalled on said bearings; hollow, gas-inflatable airfoil vanes pivotally mounted on said hub, each of said vanes comprising telescopic spars and transverse ribs slidably mounted on said spars and flexible, accordion vane skins of airfoil configuration fastened to said ribs; means supported by said space vehicle movable relative to said wall, for shielding said vanes from contact with the atmosphere while said housing is being rocket-propelled up thru the atmosphere; a reservoir of compressed gas supported on said housing; means flow-connecting said reservoir and the interiors of said hollow vanes for supplying pressurized gas to said interiors; and means, connected to said flow-connecting means, comprising a valve and valve-actuating means, for controlling the flow of pressurized gas to inflate said vanes; said hub and vanes being constructed and arranged to be rotatable by the relative wind of said housing's re-entry into the denser levels of the atmosphere.

2. A device as set forth in claim 1, in which said means for shielding said vanes comprises: a plate mounted on said vehicle opposite each of said vanes in its collapsed, stored position; a hinge between each of said plates and said vehicle, whereby each of said plates may be pivoted outward from the vehicle's longitudinal axis, from a position in which the plate closes a slot in the wall of said vehicle to a position in which said slot is open; and means to pivot said plate; whereby said plates serve as covers for said slots until they are opened, and then serve as brakes due to aerodynamic force upon them during the descent of said housing thru the atmosphere, and whereby, after the housing has been decelerated by said brakes, said vanes may be inflated and extended thru said slots to auto-rotating positions.

3. A device as set forth in claim 1, which further comprises: a control motor, mounted on said vehicle, having an axis that is fixed relative to the rotational axis of said hub; and gearing between said motor and hub; said control motor and gearing being constructed and arranged to place a variable rotary torque on said hub and vanes.

4. A re-entry missile capsule comprising: a housing having a longitudinal axis, a side wall, a rotor-supporting end wall that is normal to said axis and a plurality of slots in said side wall; a pivot bearing supported on said end wall; a thrust-taking element supported by and non-rotatable relative to the axis of said pivot bearing; a rotary hub, rotatable about said axis, constructed and arranged to bear against said element and to pivot on said pivot bearing; thrust bearings, centered on said axis, between said hub and thrust-taking element; a plurality of hollow, collapsible, inflatable vanes of airfoil shape, comprising telescopic spars pivotally mounted on said hub, said vanes being constructed and arranged to be collapsed and to be housed within said housing in their collapsed state, each of said vanes further comprising transverse ribs slidably mounted on said spars and flexible accordion vane skins fastened to said ribs; means supported by said housing, movable relative to said walls, for shielding said vanes when they are within said housing from contact with the atmosphere; a reservoir of compressed gas supported on said housing; means flow-connecting said reservoir and the interiors of said hollow vanes for supplying pressurized gas to said interiors; and means, connected to said flow-connecting means, comprising a valve and valve-actuating means, for controlling the flow of pressurized gas to inflate said vanes; said vanes and slots being constructed and arranged to cause said vanes to be extended outward from said axis, thru said slots, and to be rotated, clear of said housing, by the relative wind of the capsule's descent.

5. A device as set forth in claim 4, which further comprises: a control motor, mounted on said housing, having an axis that is fixed relative to the rotational axis of said hub; and gearing between said motor and hub; said control motor and gearing being constructed and arranged to place a variable rotary torque on said hub and vanes.

6. A rocopter comprising a vehicle designed for descent thru the atmosphere comprising: a housing having a longitudinal axis and having slots; plates hinged to said vehicle adjacent said slots for pivotal movement in planes parallel to said axis, said plates serving when closed as covers for said slots, and when open as brakes in the relative wind of descent; collapsible, inflatable, autorotating wings of airfoil configuration; means pivotally and rotatably mounting said wings on said vehicle; means carried by said housing for inflating and longitudinally extending said wings; said wings being storable within said housing opposite said slots when collapsed, and movable thru said slots into positions clear of said housing by the relative wind of descent when said plates are pivoted outward.

References Cited in the file of this patent

UNITED STATES PATENTS

| | | |
|---|---|---|
| 2,614,636 | Prewitt | Oct. 21, 1952 |
| 2,616,509 | Thomas | Nov. 4, 1952 |
| 2,640,549 | Isacco | June 2, 1953 |
| 2,654,320 | Schmid | Oct. 6, 1953 |
| 2,684,213 | Robert et al. | July 20, 1954 |
| 2,776,017 | Alexander | Jan. 1, 1957 |

FOREIGN PATENTS

| | | |
|---|---|---|
| 660,793 | Germany | June 2, 1938 |